United States Patent Office 3,238,810
Patented Mar. 8, 1966

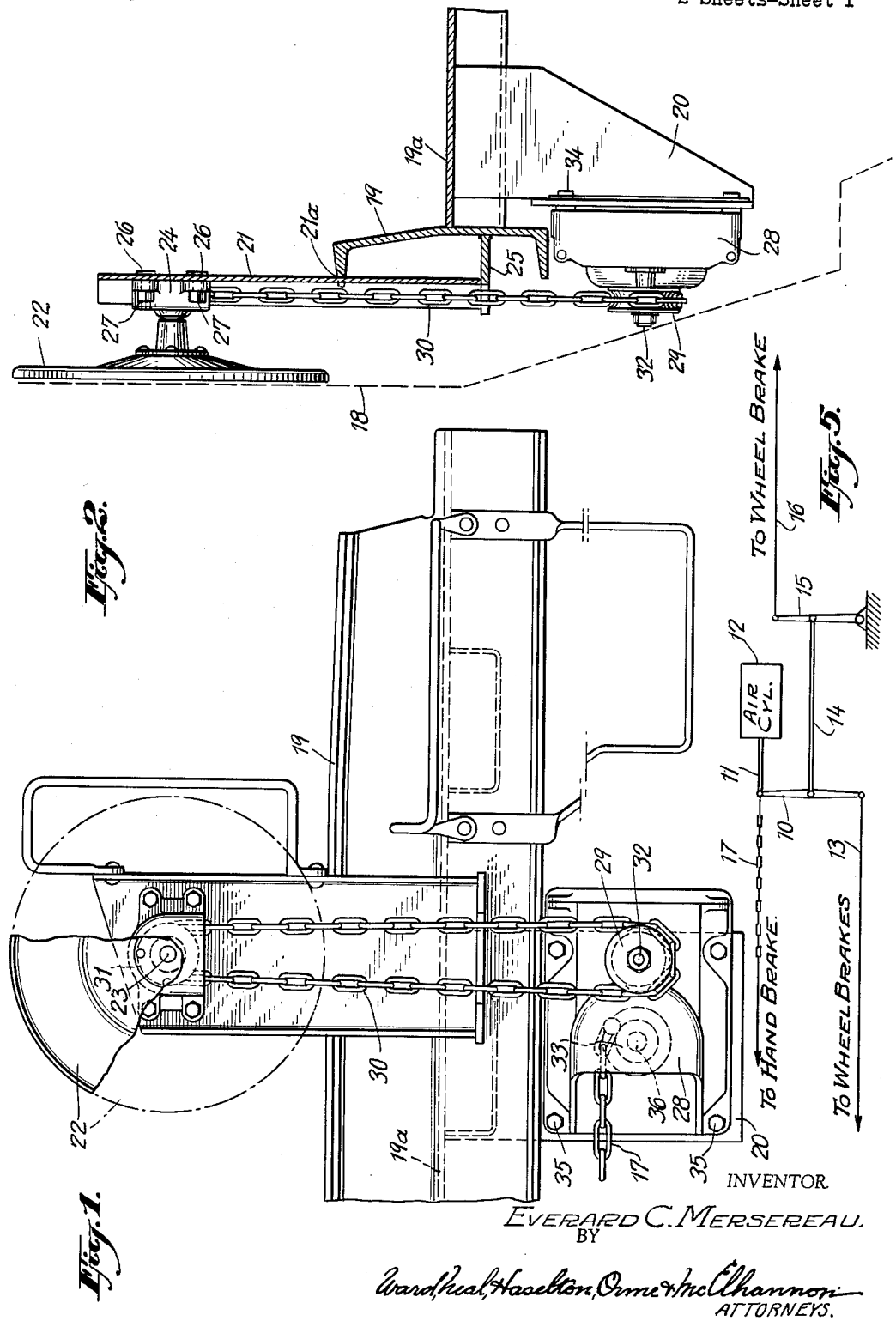

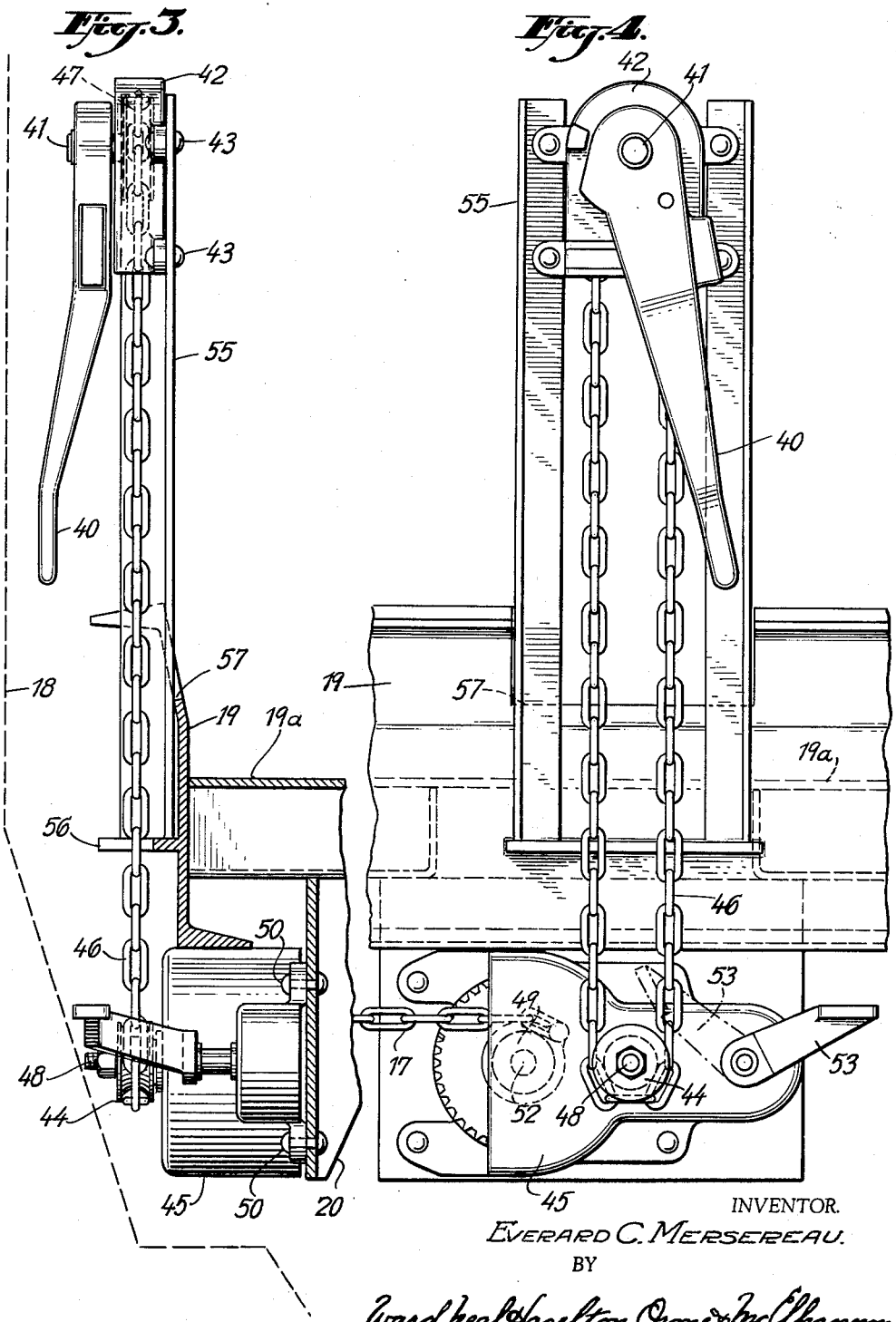

---

3,238,810
HAND BRAKE MECHANISMS
Everard C. Mersereau, Westfield, N.J., assignor to Ellcon-National, Inc., New York, N.Y., a corporation of New York
Filed Apr. 30, 1963, Ser. No. 276,763
2 Claims. (Cl. 74—505)

This invention relates to hand brake mechanims for railway cars and the mounting thereof on railway cars.

There are various types of non-spinning, hand brake mechanisms for railway cars in the prior art and one particularly successful and desirable type is shown and described in United States Patent No. 2,618,169. Another desirable type is well-known is the art and is sold under the name "Peacock Brake" Model 1260 (American Association of Railroads Certificate No. 33) by Ellcon-National, Inc., New York, New York and is shown and described in their published literature and particularly drawing D-1802-1. The internal mechanism of such latter type is like that shown in Patent No. 2,153,546. However, in recent years there has been increased use of flat cars for carrying truck trailers which has made it undesirable to mount such brake mechanisms in the normal manner, that is at the ends of the cars.

The truck trailers are relatively wide, substantially as wide as the flat cars on which they are carried, and there are standards set by the railroads which limit the outside dimensions of the cars and anything mounted or carried thereon. Accordingly, there is very little space between the clearance line to which railroad cars can be built and the trailers themselves.

Trailers usually are loaded and unloaded end-wise of the flat cars. This of course, limits the end space and height available on the cars for the placement of hand brake mechanisms. When the hand brake mechanisms are mounted in the conventional manner, it has been found that they or their mountings, and frequently the trailers, became damaged during the loading and unloading processes. Due to the limitations set by the railroads, it is not possible to move the above-identified hand brake mechanisms in their present form sufficiently far from the loading and unloading paths, and still keep them accessible, to prevent such damage.

Also, when such hand brake mechanisms have been mounted on the ends of the cars, it has been necessary to use a bell crank or other means to provide a ninety degree change in the direction of the force applied by the hand brake mechanisms because the brake applying force usually is directed lengthwise of the car whereas the mechanism force is directed vertically.

By mounting the hand brake mechanisms on a side of a flat car and relatively low down thereon, the damage problems can be overcome, and if they are properly oriented, the use of a bell crank can be eliminated. However, the above-identified hand brake mechanisms cannot be so mounted without modification because portions thereof would extend beyond the above-mentioned, railroad set, clearance limits.

In accordance with my invention, hand brake mechanisms of the above-identified type are modified so that they may be mounted on the side of a flat car with the accompanying advantages and yet not extend beyond the established clearance limits. In the preferred embodiments of the invention, the manually operable member is mounted separately from the remainder of the mechanism including the chain winding drum, and the manually operable member is drivingly interconnected with the remaining mechanism by suitable driving means, such as a chain and sprocket drive. Also, preferably, the housing containing the remaining mechanism is oriented so that the need for a bell-crank is eliminated.

One object of the invention is to provide a modified form of hand brake mechanism which may be mounted on the sides of flat cars and which will not extend beyond the established clearance limits.

Another object of the invention is to provide a novel form of hand brake mechanism mounting arrangement on a flat car.

Other objects and advantages of the invention will be apparent from the following detailed description of preferred emboidments thereof, which description should be considered in conjunction with the accompanying drawings in which:

FIG. 1 is a front elevation view of one embodiment of the hand brake mechanism mounted on a flat car, the flat car being shown in fragmentary, front elevation;

FIG. 2 is a side elevation view of the embodiment shown in FIG. 1 partly in cross-section;

FIG. 3 is a side elevation view of another embodiment of the hand brake mechanism mounted on a flat car, the flat car being shown in fragmentary, end elevation view and partly in cross-section;

FIG. 4 is a front elevation view of the embodiment shown in FIG. 3; and

FIG. 5 is a schematic drawing of a conventional brake mechanism of a railway car with which the hand brake mechanisms of the invention may be connected.

Referring first to FIG. 5, this figure illustrates in simplified form a convention type of brake rigging for railway cars. A floating lever 10 is connected at one end to a piston rod 11, the piston being contained in an air cylinder 12. The opposite end of the lever 10 is connected through a suitable linkage 13 to the wheel-brake mechanism on one truck of the railway car, and the central portion of the lever 10 is connected by means of the rod 14 to the central portion of a further lever 15. The lever 15 is pivotally connected at one end to a fixed support and at the other end it is connected to a linkage 16 which connects to the wheel brake mechanism of the other truck of the railway cars.

When air under pressure is supplied to the cylinder 12 the rod 11 moves to the left as viewed in FIG. 5 causing the brakes to be applied, and when the air supplied to the cylinder 12 is discontinued the rod 11 moves to the right releasing the brakes. To permit manual application and setting of the brakes, one end of the lever 10 is connected to the manually operable hand brake mechanism by means of a chain 17. Generally speaking, the air cylinder 12 is mounted so that the rod 11 moves along a path extending lengthwise of the railway car on which it is mounted, and therefore, the chain 17 similarly moves along a path extending lengthwise of the railway cars. If the opposite end of the chain 17 which is connected to the hand brake mechanism extends vertically from the hand brake mechanism housing, as is the case when the hand brake mechanism is mounted on an end of the car, then it is necessary to provide some means which converts vertical movement of the chain to movement of the chain lengthwise of the car, a bell crank frequently being used for such purposes.

In FIGS. 2 and 3 the dash line 18 represents the clearance line established by the railroads and a railway car and the devices carried thereby cannot extend beyond such line. It will be noted from FIGS. 2 and 3 that such line has both vertically and horizontally extending portions which limit the space beyond the side and bottom of a railway car which is available for the mounting of a hand brake mechanism. FIGS. 2 and 3 also illustrate the typical side wall structures of a flat car used for carrying truck trailers and comprises a side sill angle 19 extending substantially at right angles to the car floor 19a.

Conventional hand brake mechanisms of the type described above, cannot be mounted on or below the sill 19 because of the fact that their dimensions are such, for structural, mechanical and strength reasons, that they will extend beyond the clearance line 18. However, with the modifications of my invention the modified mechanisms can be mounted on the angle 19 and a support 20, secured to the bottom of the car floor, without extending beyond the clearance line 18 with accompanying advantages including the elimination of means for converting vertical motion of the chain extending from the brake mechanism to horizontal, or lengthwise of the car, motion of the chain 17.

One of the preferred embodiments shown in FIGS. 1 and 2 comprises a hand wheel 22 mounted on a rotatable shaft 23 which is rotatably mounted on a frame 21 in conventional bearings (not shown) supported on a housing 24. The frame 21 is supported from the side sill 19 by a bracket 25 and may, if desired, be welded to the side sill 19 at the point 21a. The housing 24 is secured to the frame 21 in any conventional manner, such as by the bolts and nuts 26 and 27. The hand wheel 22 is secured to the shaft 23 in any conventional manner so that the shaft 23 is rotatable by the hand wheel 22.

The embodiment shown in FIGS. 1 and 2 also comprises a housing 28 which is the same as the housing 15 shown in Patent No. 2,618,169 and which may contain the same interior mechanism. However, the hand wheel 23 shown in said Patent No. 2,618,169 is replaced by a sprocket 29 drivable by a chain 30. The chain 30 extends partly around the sprocket 29 and also extends partly around a sprocket 31 mounted on the shaft 23 and within the housing 24 and rotatable by the shaft 23. Accordingly, when the hand wheel 22 is rotated the sprocket 29 is also rotated causing rotation of the input shaft 32 on which the sprocket 29 is mounted and to which it is secured. If desired the sprocket 31 may be smaller than the sprocket 29 so as to provide the known mechanical advantage of such a difference in sizes.

A winding drum 33, corresponding to the winding drum 10 shown in said Patent No. 2,618,169, is mounted within the housing 28, and the housing 28 is mounted on the support 20, being secured thereto in any conventional manner, such as by bolts and nuts 34 and 35. Previously, when such housing 28 was mounted on the end of a railway car, it was customary to mount it with the axis of rotation of the shaft 32 vertically above the axis of rotation 36 of the drum 33. However, in the preferred embodiment of the invention the axis 36 is disposed in a horizontal direction with respect to the axis of the shaft 32 and hence lengthwise of the railway car. Such disposition of the axes not only prevents the housing 28 from extending below the clearance line 18 but also permits the chain 17 to extend lengthwise of the car and thereby eliminates the need for a force direction changing means, such as a bell crank.

Preferably, the axis of rotation of the shaft 23, the input shaft 32 and the winding drum 33 are substantially parallel to each other, and the shaft 23 is vertically displaced with respect to the shaft 32. In the preferred embodiment shown in FIGS. 1 and 2, the shaft 32 is displaced to one side of a straight line interconnecting the axis 36 and the axis of the shaft 23 and a line interconnecting the axis 36 and the axis of the shaft 32 extends substantially perpendicular to a stright line interconnecting the axis of the shaft 32 and the axis of the shaft 23.

The operation of the mechanism within the housing 28 is the same as the operation of the mechanism within the housing 15 described in said Patent No. 2,618,169. Thus, the shaft 32, which corresponds to the shaft 19 in said last-mentioned patent, is interconnected with the drum 33 by gears and a clutch so that when the sprocket 29 and the shaft 32 are rotated in the clockwise direction the chain 17 moves to the right as viewed in FIG. 2 causing application of the brakes. Also by rotating the sprocket 29 in small increments in the counter-clockwise direction as viewed in FIG. 1 the brakes will be released by small increments. Rotation of the sprocket 29 is caused by corresponding rotation of the hand wheel 22. Although a specific form of chain drive has been shown as interconnecting the shaft 23 and the input shaft 32, it will be apparent to those skilled in the art that other forms of chain drives or other types of drives well known in the art may be used to interconnect the shafts 23 and 32.

The second embodiment illustrated in FIGS. 3 and 4 is similar to the embodiment shown in FIGS. 1 and 2, but differs therefrom in that a different chain drum winding mechanism is employed and a handle 40 of the "pump handle" type replaces the wheel 22 and is connected to the shaft 41 by a conventional ratchet and pawl mechanism (not shown). When the handle 40 is rotated in a counter-clockwise direction, as viewed in FIG. 4, around the shaft 41, the ratchet and pawl mechanism causes the shaft 41 to rotate therewith. However, when the handle 40 is rotated in a clockwise direction, the ratchet and pawl mechanism permits the shaft 41 to remain stationary. Also, when the handle 40 is in a pendant position with respect to the shaft 41, the handle 40 is disengaged from the shaft 41 so that the latter can rotate during release of the brakes without movement of the handle 40.

The shaft 41 is rotatably mounted on a frame 55 in conventional bearings (not shown) supported on a housing 42. The frame 55 is supported from the side sill 19 by a bracket 56 and may, if desired, be welded to the side sill 19 at the point 57. The housing 42 is secured to the frame 55 in any conventional manner, such as by the rivets 43.

The second embodiment shown in FIGS. 3 and 4 also comprises a housing 45 which is the same as the housing of the above identified "Peacock" brake model 1260 and may be the same as the housing 11 shown in said Patent No. 2,153,546. The housing 45 may contain the same interior mechanism as that contained in the corresponding housing of said "Peacock" brake or it may contain the interior mechanism shown in said Patent No. 2,153,546. However, the handle and ratchet and pawl mechanism of said "Peacock" brake or of said last-mentioned patent are replaced by a sprocket 44 drivable by a chain 46. The chain 46 extends partly around the sprocket 44 and also extends partly around a sprocket 47 mounted on the shaft 41 and within the housing 42 and rotatable by the shaft 41. Accordingly, when the handle 40 is rotated in the counter-clockwise direction as viewed in FIG. 4, the sprocket 47 and hence the sprocket 45 are rotated causing rotation of the input shaft 48. If desired, the sprocket 47 may be smaller than the sprocket 45 so as to provide the known mechanical advantage of such a difference in sizes.

A chain winding drum 49 for the chain 17 is mounted within the housing 45, and the housing 45 is mounted on the support 20, being secured thereto in any conventional manner, such as by rivets 50. In the embodiment shown, the axis of rotation 52 of the drum 49 is disposed in a horizontal direction with respect to the axis of the shaft 48 rather than in a vertical direction with respect thereto as was customary when such hand brake mechanisms have been mounted on the ends of cars. Such dispositions of the axis is for the same purpose as the disposition of the axes 36 and 32 described above in connection with FIGS. 1 and 2. Preferably also, the axes of rotation of the shafts 41 and 48 and the drum 49 are substantially parallel to each other and are disposed in relation to each other in the same manner as the shafts 23 and 32 and the axis 36 as described above.

A manually operable arm or lever 53 extends from the housing 45 and controls a ratchet and pawl mechanism within the housing 45, in the same manner that such are controlled in the prior art mechanisms, to hold the winding drum 49 in a fixed position or to release it and thereby releases the brakes. In the position of the arm 53 shown in FIGS. 3 and 4 in solid lines, the drum 49 is free to rotate whereas when the arm 53 is in the position shown in the dotted lines in FIG. 4, the drum 49 is held in a fixed position against the pull of the chain 17.

In operation, rotation of the handle 40 in the counter-clockwise direction causes counter-clockwise rotation of the sprocket 45 as viewed in FIG. 4 and hence causes clockwise rotation of the shaft 48. Through a gear train within the housing 45, the shaft 48 causes the drum 49 to rotate in a direction such that the chain 17 moves to the right as viewed in FIG. 4, causing application of the brakes. The arm 53 is moved into the position shown in dotted lines during this time and will, therefore, maintain the brakes in their applied condition. When it is desired to release the brakes, the arm 53 is moved to the position shown in solid lines in FIG. 4 thereby releasing the drum 49 and permitting the sprockets 45 and 47 to turn. However, the arm 40 will not move due to the ratchet and pawl mechanism by which it is interconnected with the shaft 41.

Although a specific form of chain drive, like that shown in FIGS. 1 and 2, has been shown as interconnecting the shafts 41 and 48, it will be apparent to those skilled in the art that other forms of chain drives or other types of drives well known in the art may be used to interconnect the shafts 41 and 48.

It will be apparent from an examination of the two preferred embodiments of the invention that the hand brake mechanisms of the invention may be mounted on the sides of flat cars and still be within the established clearance limits. Also, the manually operable member which actuates the mechanisms is readily accessible and the actuating chain 17 extends from the brake mechanism housing in a direction lengthwise of the cars so that the use of force direction changing means, such as a bell crank, is unnecessary.

Having thus described my invention with particular reference to the preferred form thereof and having described certain modifications, it will be obvious to those skilled in the art to which the invention pertains after understanding my invention that various changes and other modifications may be made therein without departing from the spirit and scope thereof as defined by the claims appended hereto.

What is claimed as new and desired to be secured by Letters Patent is:

1. In combination with an end loading railway car having a power operated brake mechanism and a side wall extending lengthwise of said car, a manually operable brake mechanism comprising a hand wheel disposed outwardly of said side wall mounted on a rotatable shaft having its axis of rotation extending transversely to the length of said car and to said side wall, said shaft being rotatable by said wheel, means on said side wall for rotatably supporting said shaft, a housing mounted on said side wall below said shaft, a chain winding drum rotatably mounted in said housing with its axis of rotation substantially parallel to said axis of said shaft, a chain interconnecting said drum and said power operated brake mechanism and extending lengthwise of said car from said housing, a driving mechanism in said housing for driving said drum, said driving mechanism having a rotatable input shaft extending from said housing and with its axis of rotation substantially parallel to said axis of said shaft and including clutch means interconnecting said input shaft and said drum, said input shaft being located in a direction lengthwise of said car from said axis of said drum and below said first-mentioned shaft, and two way chain drive means interconnecting said first-mentioned shaft and said input shaft.

2. An end loading railway flat car especially adapted to transport road truck trailers comprising an elongated longitudinally extending frame, a side wall extending lengthwise of said car, a pair of wheeled trucks respectively supporting the opposite ends of said frame, a pair of brake mechanisms respectively incorporated in said trucks, brake linkage carried by said frame for controlling said brake mechanisms, manually operable hand brake mechanism disposed under said frame, by one side of said frame and adjacent one end thereof, said hand brake mechanism including a hand wheel projecting laterally outwardly from said side wall, all of the elements of said hand brake mechanism including said hand wheel being arranged laterally inwardly so that no one of them projects beyond the clearance line, said hand wheel being mounted on a rotatable shaft having its axis of rotation extending transversely to the length of said car and to said side wall, said shaft being rotatable by said wheel, means on said side wall for rotatably supporting said shaft, a housing mounted on said side wall below said shaft, a chain winding drum rotatably mounted in said housing with its axis of rotation substantially parallel to said axis of said shaft, a chain interconnecting said drum and said power operated brake mechanism and extending lengthwise of said car from said housing, a driving mechanism in said housing for driving said drum, said driving mechanism having a rotatable input shaft extending from said housing and with its axis of rotation substantially parallel to said axis of said shaft and including clutch means interconnecting said input shaft and said drum, said input shaft being located in a direction lengthwise of said car from said axis of said drum and below said first-mentioned shaft, and two way chain drive means interconnecting said first-mentioned shaft and said input shaft.

References Cited by the Examiner

UNITED STATES PATENTS

| | | | |
|---|---|---|---|
| 1,052,967 | 2/1913 | Rochambeau | 74—505 X |
| 1,270,762 | 7/1918 | Ackley | 74—505 X |
| 1,628,060 | 5/1927 | Payne | 74—505 |
| 1,832,805 | 11/1931 | Brewster | 74—505 X |
| 2,437,491 | 3/1948 | Williams | 74—505 |

BROUGHTON G. DURHAM, *Primary Examiner.*